(12) United States Patent
Sawano

(10) Patent No.: US 6,486,241 B2
(45) Date of Patent: *Nov. 26, 2002

(54) POLYCARBONATE RESIN COMPOSITION

(75) Inventor: Yuzuru Sawano, Utsunomiya (JP)

(73) Assignee: General Electric Company, Pittsfield, MA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/392,683

(22) Filed: Sep. 9, 1999

(65) Prior Publication Data

US 2002/0161111 A1 Oct. 31, 2002

Related U.S. Application Data

(63) Continuation-in-part of application No. 09/140,006, filed on Aug. 26, 1998, now abandoned.

(30) Foreign Application Priority Data

Aug. 29, 1997 (JP) .............................. 9-249865

(51) Int. Cl.$^7$ .......................... C08L 69/00; C08F 5/523
(52) U.S. Cl. ..................... 524/109; 524/127; 524/141; 525/65; 525/67; 525/146
(58) Field of Search ................. 525/65, 67, 146; 524/109, 127, 141

(56) References Cited

U.S. PATENT DOCUMENTS

| | | |
|---|---|---|
| 2,393,967 A | 2/1946 | Brubaker |
| 2,891,920 A | 6/1959 | Hyde et al. |
| 3,125,529 A | 3/1964 | Simmons et al. |
| 3,169,121 A | 2/1965 | Goldberg |
| 3,294,725 A | 12/1966 | Findlay et al. |
| 3,383,092 A | 5/1968 | Cazier |
| 3,422,453 A | 1/1969 | Frank |
| 3,492,373 A | 1/1970 | Matson et al. |
| 3,553,185 A | 1/1971 | Amagi et al. |
| 3,671,487 A | 6/1972 | Abolins |
| 3,723,373 A | 3/1973 | Lucas |
| 4,315,082 A | 2/1982 | Beacham et al. |
| 4,487,896 A | 12/1984 | Mark et al. |
| 4,526,926 A | 7/1985 | Weber et al. |
| 4,579,906 A | 4/1986 | Zabrocki et al. |
| 4,624,986 A * | 11/1986 | Weber |
| 4,972,011 A | 11/1990 | Richardson et al. |
| 5,026,777 A * | 6/1991 | Jalbert |
| 5,072,014 A | 12/1991 | Flury |
| 5,102,932 A | 4/1992 | Gainer |
| 5,115,005 A | 5/1992 | Hörner |
| 5,130,452 A | 7/1992 | Flury et al. |
| 5,132,346 A | 7/1992 | Flury |
| 5,204,394 A | 4/1993 | Gosens et al. |
| 5,300,568 A | 4/1994 | Abe et al. |
| 5,302,645 A | 4/1994 | Nakano et al. |
| 5,521,230 A | 5/1996 | Bhatia et al. |
| 5,621,029 A | 4/1997 | Eckel et al. |
| 5,663,280 A | 9/1997 | Ogoe et al. |
| 5,723,526 A | 3/1998 | Nagasawa |
| 5,741,838 A | 4/1998 | Fuhy et al. |
| 5,750,756 A | 5/1998 | Bright et al. |
| 5,900,446 A | 5/1999 | Nishihara et al. |
| 5,961,915 A | 10/1999 | Toyouchi et al. |
| 6,093,760 A | 7/2000 | Nishihara et al. |
| 6,127,465 A | 10/2000 | Nodera |

FOREIGN PATENT DOCUMENTS

| | | |
|---|---|---|
| EP | 0 207 369 A | 1/1987 |
| EP | 0 360 578 A | 3/1990 |
| EP | 0 641 827 B1 | 9/1994 |
| EP | 0 690 063 B1 | 6/1995 |
| EP | 0 739 914 B1 | 4/1996 |
| EP | 0 829 517 A1 | 5/1996 |
| EP | 0 758 003 A2 | 8/1996 |
| JP | XP-002088631 | 11/1992 |
| JP | 302175 | * 11/1996 |
| JP | XP-002088628 | 12/1996 |
| JP | XP-002088639 | 2/1997 |
| JP | XP-002088630 | 4/1998 |
| WO | WO 91 07466 A | 5/1991 |
| WO | WO 91 18052 A | 11/1991 |
| WO | WO 96/13508 | 5/1996 |
| WO | WO 96/27637 | 9/1996 |
| WO | WO 99/11713 | 3/1999 |

OTHER PUBLICATIONS

Polymer Science Dictionary p. 253, Apr. 1992.*
Caplus Abstract for JP 02124934.
Caplus Abstract for JP 05–186681.
Caplus Abstract for JP 06172611.
Caplus Abstract for JP 63215763.
Caplus Abstract for JP 10147701.
Caplus Abstract for JP 10158498.
Caplus Abstract for JP 10216487.
Caplus Abstract for JP 10251468.

(List continued on next page.)

Primary Examiner—David J. Buttner

(57) ABSTRACT

A polycarbonate resin composition with improved moisture resistance maintains outstanding physical properties even in high-temperature, high-humidity aging and comprises a polycarbonate resin composition containing (B) (B-1) 1 to 99 parts by weight of a copolymer having as its component parts (a) an aromatic vinyl monomer component, (b) a cyanide vinyl monomer component, and (c) a rubber-like polymer, and/or (B-2) a copolymer having as its component parts (a) an aromatic vinyl monomer component and (b) a cyanide vinyl monomer component, with respect to (A) 1 to 99 parts by weight of polycarbonate resin having a viscosity average molecular weight within a specified range, said copolymer containing an amount of various alkali metals of 1 ppm or less, and (C) 0 to 40 parts by weight of a phosphoric ester compound blended in with respect to a total of 100 parts by weight of the aforementioned components (A) and (B).

12 Claims, No Drawings

OTHER PUBLICATIONS

Caplus Abstract for JP 07196873.
Caplus Abstract for JP 07207137.
Caplus Abstract for JP 10025399.
Caplus Abstract for JP 07238218.
Caplus Abstract for JP 07207132.
Caplus Abstract for JP 07196873.
Caplus Abstract for JP 07207137.
Caplus Abstract for JP 09310011.
Caplus Abstract for JP 08239565.
Caplus Abstract for JP 08239551.
Caplus Abstract for JP 01079257.
Caplus Abstract for JP 09–100405.
Derwent Abstract Record for JP 08–302175.

* cited by examiner

POLYCARBONATE RESIN COMPOSITION

The present application is a continuation-in-part of U.S. patent application Ser. No. 09/140,006 filed Aug. 26, 1998 now abandoned, which claims the benefit of Japanese Patent Application No. HEI 09-249865 filed Aug. 29, 1997.

The present invention concerns a polycarbonate resin composition containing polycarbonate resin, and more specifically, a polycarbonate resin composition showing outstanding moisture resistance and little decrease in tensile properties.

Polymer alloys composed of a blend of polycarbonate resin (PC) and acrylonitrile-butadiene-styrene (ABS) resin are widely used in applications such as electrical and electronic products and office automation equipment. In recent years, with the increasing requirement for miniaturization and light weight of such products, new molding methods have been attempted, and resins used in such products must increasingly have thin-wall properties, precision molding properties, and high flame retardancy. There has been rapid growth in manufacturing and use in these applications in southeast Asia in recent years. Because of the use and storage of products in high-humidity environments in areas such as southeast Asia, there is frequently a risk of physical deterioration due to low moisture resistance of the resins used.

Generally speaking, polymer alloys containing blends of PC and ABS resin cannot be said to show high moisture resistance. In the case of flame-retardant resin compositions in particular, it is not possible to maintain a high level of moisture resistance.

The present invention provides a flame-retardant resin composition showing moisture resistance which is superior to that of conventional blended alloys of PC and ABS resin.

As a result of thorough research on polycarbonate resin compositions in order to solve the aforementioned problem, the inventors discovered that by using an ABS copolymer in which the alkali metal content of the polycarbonate composition is low and adding an epoxy stabilizer, it is possible to improve moisture resistance, thus arriving at the present invention. Moreover, concerning flame-retardant resin compositions, they discovered that a flame-retardant resin composition showing particularly high moisture resistance compared to conventional compositions could be obtained by using flame retardants in which the acid value of the phosphoric ester was low.

Specifically, the present invention comprises a polycarbonate resin composition containing (A) 1 to 99 parts by weight of polycarbonate resin having a viscosity average molecular weight of 10,000 to 100,000, and (B) 1 to 99 parts by weight of (B-1) a copolymer having as its component parts (a) an aromatic vinyl monomer component, (b) a cyanide vinyl monomer component, and (c) a rubber-like polymer, or (B-2) a copolymer having as its component parts (a) an aromatic vinyl monomer component and (b) a cyanide vinyl monomer component, the aforementioned B-2 being a copolymer having a weight average molecular weight of 30,000 to 200,000 and containing an amount of various alkali metals of 1 ppm or less, and blended in (C) 0 to 40 parts by weight of a phosphoric ester compound with respect to a total of 100 parts by weight of the aforementioned components (A) and (B).

Moreover, by adding to this resin composition 0 to 3 parts by weight of (E) an epoxy stabilizer with respect to a total of 100 parts by weight of the aforementioned components (A) and (B), and as an optional component, 0.01 to 3 parts, preferably 0.05 to about 2, and more preferably from about 0.1 to about 1, by weight of (F) polytetrafluoroethylene with respect to a total of 100 parts by weight of the aforementioned components (A) and (B), a polycarbonate resin composition having even more outstanding moisture resistance can be produced.

The following is an explanation of the various components of the resin composition of the present invention. The polycarbonate resin used in the present invention is an aromatic polycarbonate manufactured by the commonly-known phosgene method or the melt polymerization method (cf. Japanese Unexamined Patent Applications S63-215763 and H2-124934). Examples of the diphenols used as raw materials include 2,2-bis(4-hydroxyphenyl)propane (referred to as bisphenol A); 2,2-bis(3,5-dibromo-4-hydroxyphenyl)propane; 2,2-bis(3,5-dimethyl-4-hydroxyphenyl)propane; 1,1-bis(4-hydroxyphenyl)cyclohexane; 1,1-bis(3,5-dimethyl-4-hydroxyphenyl)cyclohexane; 1,1-bis(3,5-dimethyl-4-hydroxyphenyl)cyclohexane; 1,1-bis(4-hydroxyphenyl)decane; 1,4-bis(4-hydroxyphenyl)propane; 1,1-bis(4-hydroxyphenyl)cyclododecane; 1,1-bis(3,5-dimethyl-4-hydroxyphenyl)cyclododecane; 4,4-dihydroxydiphenyl ether; 4,4-thiodiphenol; 4,4-dihydroxy-3,3-dichlorodiphenyl ether; and 4,4-dihydroxy-2,5-dihydroxydiphenyl ether. Moreover, examples of precursor substances for introducing the carbonate include phosgene and diphenylcarbonate.

In the present invention, the viscosity average molecular weight (Mv) of the polycarbonate resin should be 10,000 or more, preferably 16,000 or more and more preferably 21,000 or more, with a viscosity average molecular weight of 22,000 being particularly preferred. The upper limit of viscosity average molecular weight should be 100,000, and in practice, this limit is usually about 40,000. In the present invention, viscosity average molecular weight was measured based on intrinsic viscosity (limiting viscosity) in methylene chloride at 20° C., and it was calculated as follows using the Mark-Houwink viscosity formula:

$$\text{Limiting viscosity} = K(Mv)^a$$

In the formula, K and a are constants; K=1.23 E-4, a=0.83.

Component (B-1) is a copolymer containing (a) an aromatic vinyl monomer component, (b) a cyanide vinyl monomer component, and (c) a rubber-like polymer.

Examples of (a) the aromatic vinyl monomer include styrene, α-methylstyrene, o-, m-, or p-methylstyrene, vinyl xylene, monochlorostyrene, dichlorostyrene, monobromostyrene, dibromostyrene, fluorostyrene, p-tert-butylstyrene, ethylstyrene, and vinyl naphthalene, and these substances may be used individually or in combinations of two or more; α-methylstyrene should preferably be used.

Examples of (b) the cyanide vinyl monomer component include acrylonitrile and methacrylonitrile, and these substances may be used individually or in combinations of two or more. There are no particular restrictions on the composition ratio of this component, and this ratio should be selected according to the application in question.

Examples of (c) the rubber-like polymer include polybutadiene, polyisoprene, styrene-butadiene random copolymer and block copolymer, hydrogenates of said block copolymers, diene rubbers such as acrylonitrile-butadiene copolymer and butadiene-isoprene copolymer, ethylene-propylene random copolymer and block copolymer, copolymers of ethylene and α-olefins, ethylene-unsaturated carboxylic acid ester copolymers such as ethylene-methacrylate and ethylene-butylacrylate, acrylate ester-butadiene copolymers, for example, acrylic elastomeric polymers such as butylacrylate-butadiene copolymer, copolymers of ethylene and aliphatic vinyl such as ethylene-vinyl acetate, and ethylene-propylene non-conjugated diene terpolymers such as ethylene-propylene-hexadiene copolymer, butylene-isoprene copolymer, and chlorinated polyethylene, and these substances may be used individually or in combinations of two or more. Preferred rubber-like polymers are ethylene-propylene non-conjugated diene terpolymer, diene rubber, and acrylic elastomeric polymers, with polybutadiene and styrene-butadiene copolymer being particularly preferred.

In addition to the aforementioned components (a), (b), and (c) of component (B), one may also use (d) monomers which are copolymerizable with these components in amounts which do not adversely affect the purpose of the present invention. Examples of such copolymerizable monomers include α,β-unsaturated carboxylic acids such as acrylic acid and methacrylic acid, α,β-unsaturated carboxylic acid esters such as methyl(meth)acrylate, ethyl(meth) acrylate, propyl(meth)acrylate, butyl(meth)acrylate, 2-ethyl (meth)acrylate, and 2-ethylhexylmethacrylate; α,β-unsaturated dicarboxylic anhydrides such as maleic anhydride and itaconic anhydride; imide compounds of α,β-unsaturated dicarboxylic acids such as maleimide, N-methylmaleimide, N-ethylmaleimide, N-phenylmaleimide, and N-o-chlorophenylmaleimide, etc., and these monomers may be used individually or in combinations of two or more.

A graft copolymer in which the other components are graft-copolymerized in the presence of (c) a rubber-like polymer is preferred as the copolymer of component (B), with particularly preferred examples being ABS resin (acrylonitrile-butadiene-styrene copolymer), AES resin (acrylonitrile-ethylene-propylene-styrene copolymer), ACS resin (acrylonitrile-chlorinated polyethylene-styrene copolymer), and AAS resin (acrylonitrile-acrylic elastomer-styrene copolymer).

Component (B-2) is a copolymer containing (a) an aromatic vinyl monomer component and (b) a cyanide vinyl monomer component. (B-2) contributes toward improving the moldability (fluidity) of the resin. Examples of (a) the aromatic vinyl monomer component include α-methylstyrene, o-, m-, or p-methylstyrene, vinyl xylene, monochlorostyrene, dichlorostyrene, monobromostyrene, dibromostyrene, fluorostyrene, p-tert-butylstyrene, ethylstyrene, and vinyl naphthalene, and these substances may be used individually or in combinations of two or more, with α-methylstyrene being preferred.

Examples of (b) the cyanide vinyl monomer component include acrylonitrile and methacrylonitrile, and these may be used individually or in combinations of two or more. There are no particular restrictions on the composition ratio thereof, and this ratio should be selected according to the application in question. There are no particular restrictions on the composition ratio of (a) to (b), but the two components should be included in amounts of 95 to 50% by weight of (a) and 5 to 50% by weight of (b) in component (B), with amounts of 92 to 65% by weight of (a) and 8 to 35% by weight of (b) being particularly preferred. A preferred example of the copolymer of component (B) is SAN resin.

In the present invention, the weight average molecular weight (Mw) of component (B-2) should be 30,000 to 200,000, with a range of 30,000 to 110,000 being preferred.

There are no particular restrictions on the method of manufacturing the copolymer of component (B-2), and any commonly-known method may be used, such as bulk polymerization, solution polymerization, bulk suspension polymerization, suspension polymerization, and emulsion polymerization. Moreover, the individually copolymerized resins may also be blended.

Preferred methods for manufacturing component (B) of the present invention are bulk polymerization, solution polymerization, and bulk suspension polymerization. The alkali metal content of component (B) should be 1 ppm or less, and preferably 0.5 ppm or less, with a content of 0.1 ppm or less being particularly preferred. Moreover, among alkali metals, the content of sodium and potassium in component (B) should be 1 ppm or less, and preferably 0.5 ppm or less, with a content of 0.1 ppm or less being particularly preferred.

Component (C) used in the present invention is a flame retardant, with a specific example being a phosphoric ester compound having the following formula:

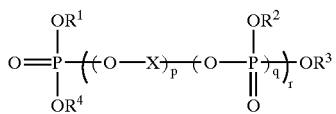

(where $R^1$, $R^2$, $R^3$, and $R^4$ are independent hydrogen atoms or organic groups, excluding the case of $R^1=R^2=R^3=R^4=H$. X denotes an organic group having a valency of 2 or above, p is 0 or 1, q is 1 or a higher integer, preferably less than 30, and r is 0 or a higher integer.

Examples of the organic group in the above formula include an alkyl group, a cycloalkyl group, or an aryl group which may or may not be substituted. In the case of substituted groups, examples of the substituent include an alkyl group, alkoxy group, alkylthio group, halogen, aryl group, aryloxy group, arylthio group, or halogenated aryl group, and groups such as these may be used as substituents in combined groups (such as an arylalkoxy alkyl group) or combined groups in which these substituents are bound by oxygen, sulfur, or nitrogen atoms (such as an arylsulfonyl aryl group). Furthermore, the phrase "an organic group having a valency of 2 or higher" refers to a group having a valency of 2 or higher created by removing one or more hydrogen atoms bound to carbon atoms from the aforementioned organic groups. Examples include an alkylene group, or preferably a phenylene group, substituted or unsubstituted, and substances derived from polynuclear phenols, such as bisphenols, with the relative position of the free valency of 2 or higher being not critical. Particularly preferred examples include hydroquinone, resorcinol, diphenylol methane, diphenylol dimethylmethane, dihydroxydiphenyl, p,p'-dihydroxydiphenylsulfone, bisphenol A, bisphenol S, and dihydroxynaphthalene.

Specific examples of phosphoric ester compounds include trimethylphosphate, triethylphosphate, tributylphosphate, trioctylphosphate, tributoxyethylphosphate, triphenylphosphate, tricresylphosphate, cresylphenylphosphate, octyldiphenylphosphate, diisopropylphenylphosphate, tris(chloroethyl)phosphate, tris(dichloropropyl)phosphate, tris(chloropropyl)phosphate, bis(2,3-dibromopropyl)-2,3-dichloropropylphosphate, tris (2,3-dibromopropyl)phosphate, bis(chloropropyl) monooctylphosphate, bisphenol A tetraphenyldiphosphate, bisphenol A tetracresyldiphosphate, bisphenol A tetraxylyldiphosphate, hydroquinone tetraphenyldiphosphate, hydroquinone tetracresyldiphosphate, hydroquinone tetraxylyldiphosphate, bisphenol A bisphosphate in which $R^1$–$R^4$ are alkoxy groups such as a methoxy, ethoxy, or propoxy group, and preferably, a (substituted) phenoxy group such as a phenoxy or methyl (substituted) phenoxy group, hydroquinone bisphosphate, resorcinol bisphosphate, and trioxybenzene triphosphate, preferably triphenylphosphate and various bisphosphates.

The aforementioned component (C) is added in cases where flame retardancy is necessary, and the amount added should be 1–40 parts by weight with respect to a total of 100 parts by weight of components (A)+(B), and preferably 3–30 parts by weight, with an amount of 5–20 parts by weight being particularly preferred. If the amount of component (C) is less than the aforementioned range, the effect of the present invention will not be manifested to a sufficient degree, and if it exceeds this range, thermal resistance will be impaired. In the present invention, moreover, it is important that the acid value of the aforementioned phosphoric ester be 1 or less. The acid value of the phosphoric ester should preferably be 0.5 or less, and more preferably, 0.2 or less, and a level of 0.1 or less is particularly preferred, with a level infinitely close to 0 being effective in promoting the hydrolysis resistance of the resin composition of the present invention.

In order to further improve the hydrolysis resistance of the present invention, one may add the epoxy stabilizer of component (E). A preferred epoxy stabilizer is (3',4'-epoxycyclohexane)methyl 3,4-epoxycyclohexylcarboxylate. This stabilizer may be commercially obtained in the form of R-51 from Asahi Chemical Industries or Celloxide 2021P manufactured by Daicel Chemical Industries. The amount added can be 0.01 to 10 parts by weight with respect to a total of 100 parts by weight of component (A)+(B), with an amount of 0.1 to 0.5 parts by weight being preferred. Moreover, the epoxy stabilizer used is not limited to those blends having the above composition.

Together with the flame retardant, an antidripping agent may also be blended into the resin composition of the present invention. This is component (F), polytetrafluoroethylene. Fluorinated polyolefins which may be used as such an antidripping agent may be commercially obtained or manufactured by a commonly-known method. An example of this is a method in which tetrafluoroethylene is polymerized in an aqueous medium in the presence of a free radical catalyst (such as sodium, potassium, or ammonium peroxydisulfate) at a pressure of 100–1,000 psi and a temperature of 0–200° C., and preferably 20–100° C. to obtain a white solid. This is presented in detail in the specification of Brubaker's U.S. Pat. No. 2,393,967.

Although this is not indispensable, it is preferable to use resin having particles with a relatively large diameter, such as an average diameter of 0.3–0.7 mm (chiefly 0.5 mm). This is preferable to ordinary polytetrafluoroethylene powder, which has a particle diameter of 0.05–0.5 mm. The reason why such relatively large-diameter materials are particularly preferred is that they can be easily dispersed in the polymer and show a tendency toward binding of the polymers to one another, resulting in the formation of a fibrous material. The optimum type of this polytetrafluoroethylene is referred to by the ASTM as type 3, and it can be commercially obtained as Teflon 6 (commercial name) manufactured by E.I. Dupont de Nemours and Company. Alternatively, Teflon 30J (commercial name), manufactured by Mitsui Dupont Fluorochemical K.K., may also be commercially obtained. The fluoroolefin can be used in the amount of 0.01 to 1 part by weight, and preferably 0.05 to 1.0 part by weight, with respect to a total of 100 parts by weight of components (A)+(B). In addition, substances such as polysiloxane may be added as flame-retardant and antidripping agents in an amount of 0.1 to 20 parts by weight with respect to a total of 100 parts by weight of components (A) and (B).

Furthermore, in addition to the components mentioned above, other common additives such as pigments, dyes, reinforcing agents (talc, mica, clay, glass fibers, glass flakes, milled glass, carbon fibers, fibrils, silica, glass beads, metal fibers, wollastonite, etc.), colorants (carbon black, titanium oxide, etc.), heat resistance agents, antioxidants, weatherproofing agents (ultraviolet absorbers), lubricants, mold-releasing agents, crystal nucleating agents, plasticizers, fluidity-improving agents, antistatic agents, and inorganic and organic antibacterial agents may be blended in with the heat-resistant resin composition of the present invention during mixing or molding of the resin provided that these do not impair the physical properties of the composition. Specific examples of ultraviolet absorbers, stabilizers, and mold-releasing agents are given below.

Any of the resin compositions of the present invention may contain phosphorus stabilizers as optional components. Any phosphorus stabilizer marketed by a manufacturer of stabilizers, for example, as an antioxidant, may be used. Specific examples include triphenylphosphite, diphenylnonylphosphite, tris(2,4-di-t-butylphenyl) phosphite, trisnonylphenylphosphite, diphenylisooctylphosphite, 2,2'-methylenebis(4,6-di-t-butylphenyl)octylphosphite, diphenylisodecylphosphite, diphenylmono(tridecyl)phosphite, 2,2'-ethylidenebis(4,6-di-t-butylphenol)fluorophosphite, phenyldiisodecylphosphite, phenyldi(tridecyl)phosphite, tris(2-ethylhexyl)phosphite, tris(isodecyl)phosphite, tris(tridecyl)phosphite, dibutylhydrogen phosphite, trilauryltrithiophosphite, tetrakis(2,4-di-t-butylphenyl)-4,4'-biphenylene diphosphite, 4,4'-isopropylidene diphenolalkyl(C12–C15)phosphite, 4,4'-butylidenebis(3-methyl-6-t-butylphenyl) ditridecylphosphite, bis(2,4-di-t-butylphenyl)pentaerythritol diphosphite, bis(2,6-di-t-butyl-4-methylphenyl) pentaerythritol diphosphite, bis(nonylphenyl)pentaerythritol diphosphite, distearyl-pentaerythritol diphosphite, phenyl-bisphenol A pentaerythritol diphosphite, tetraphenyldipropylene glycol diphosphite, 1,1,3-tris(2-methyl-4-di-tridecylphosphite-5-t-butylphenyl)butane, and 3,4,5,6-dibenzo-1,2-oxaphosphane-2-oxide. Examples of commercially-available products include Adekastab PEP-36, PEP-24, PEP-4C, PEP-8 (commercial names, manufactured by Asahi Denka Kogyo), Irgafos 168 (commercial name, manufactured by Ciba-Geigy), Sandstab P-EPQ (commercial name, manufactured by Sandoz), Chelex L (commercial name, manufactured by Sakai Chemical Industry Co.), 3P2S (commercial name, manufactured by Ihara Chemical Industry Co.), Mark 329K, Mark P (commercial names, manufactured by Asahi Denka Kogyo), and Weston 618 (commercial name, manufactured by Sanko Chemical Co.). There are no restrictions on the amount of the phosphorus stabilizer to be added, but it should preferably be added in an amount of 0.0001 to 5 parts by weight with respect to a total of 100 parts by weight of component (A)+(B).

In addition, additives such as hindered phenol antioxidants, epoxy stabilizers, and sulfur stabilizers may also be used. Examples of hindered phenol antioxidants include n-octadecyl-3-(3',5'-di-t-butyl-4-hydroxyphenyl) propionate, 2,6-di-t-butyl4-hydroxymethylphenol, 2,2'-methylenebis(4-methyl-6-t-butylphenol), and pentaerythritol-tetrakis[3-(3,5-di-t-butyl-4-hydroxyphenyl)] propionate. Examples of epoxy stabilizers include epoxidized soybean oil, epoxidized linseed oil, phenyl glycidyl ether, allyl glycidyl ether, and 3,4-epoxycyclohexylmethyl- 3',4'-epoxycyclohexane carboxylate. There are no particular restrictions on the amount of these additives to be used, but they should preferably be added in an amount of 0.0001 to 5 parts by weight with respect to a total of 100 parts by weight of components (A)+(B).

Furthermore, mold-releasing agents may be added in order to improve mold-releasing properties. Examples of preferred mold-releasing agents include silicone mold-releasing agents such as methylphenyl silicone oil and ester or olefin mold-releasing agents such as pentaerythritol tetrastearate, glycerin monostearate, montanic acid wax, and polyalphaolefins. There are no particular restrictions on the amount of these additives to be used, but they should preferably be added in amounts of 0.0001 to 5 parts by weight with respect to a total of 100 parts by weight of components (A)+(B).

Any ultraviolet absorber commonly used in PC resin compositions may be used in the present invention, such as benzotriazole ultraviolet absorbers, benzophenone ultraviolet absorbers, and salicylate ultraviolet absorbers. Examples of benzotriazole ultraviolet absorbers include 2-(2'-hydroxy-5'-methylphenyl)benzotriazole, 2-(2'-hydroxy-5'-t-butylphenyl)benzotriazole, 2-(2'-hydroxy-5'-t-octylphenyl)benzotriazole, 2-(2'-hydroxy-3',5'-di-t-butylphenyl)benzotriazole, 2-(2'-hydroxy-3',5'-di-amylphenyl)benzotriazole, 2-(2'-hydroxy-3'-dodecyl-5'-methylphenyl)benzotriazole, 2-(2'-hydroxy-3',5'-dicumylphenyl)benzotriazole, and 2,2'-methylenebis[4-(1,1,3,3-tetramethylbutyl)-6-(2H-benzotriazole-2-yl)phenol]. An example of a benzotriazole ultraviolet absorber is UV5411, marketed by American Cyanamid. An example of a benzophenone ultraviolet absorber is UV531, also marketed by American Cyanamid. Examples of salicylate ultraviolet absorbers include phenyl salicylate, p-t-butylphenyl salicylate, and p-octylphenyl salicylate. There are no particular restrictions on the amounts of these additives to be used, but they can preferably be added in amounts of 0.0001 to 5 parts by weight with respect to a total of 100 parts by weight of components (A)+(B).

A compatibilizer may also be added to the thermoplastic resin composition of the present invention. These compatibilizers may be copolymers in which acrylonitrile-styrene copolymer is grafted onto polycarbonate or copolymers in which polystyrene resin is grafted onto polycarbonate, with examples including Modipa C H430, L430D, and L150D manufactured by Nippon Yushi K.K. Moreover, polymethylmethacrylate (PMMA) may also be used as a compatibilizer. There are no particular restrictions on the amounts of these substances to be used, but they should preferably be added in amounts of 0.1 to 30 parts by weight with respect to a total of 100 parts by weight of components (A)+(B).

There are no particular restrictions on the method of manufacturing the resin composition of the present invention, and any common method may be satisfactorily used. Nevertheless, the melt mixing method is generally preferred. Small amounts of solvents may also be used, but these are generally unnecessary. Specific examples of devices which may be used include extruders, Banbury mixers, rollers, and kneaders. These devices may operate either by the batch method or continuously. Furthermore, there are no particular restrictions on the order of mixing of the components of the composition.

The following is a presentation of the present invention by means of examples. The materials used in preparing the thermoplastic resin composition of the present invention are discussed below.

A polycarbonate Lexan using bisphenol A, Lexan 141 (commercial name; manufactured by Nihon GE Plastics K.K.), was used as the polycarbonate of component (A) (intrinsic viscosity 0.50 dl/g measured at 20° C. in methylene chloride, Mv=approximately 23,000 (calculated values)).

The other components used were as follows.

Component (B): ABS resin: Santak AT-07 (commercial name; manufactured by Mitsui Kagaku K.K.)

Component (B): ABS resin: UX050 (commercial name; manufactured by Ube Saikon K.K.)

Component (C): Resorcinol diphosphate: CR733S (commercial name; manufactured by Daihachi Chemical Industry Co.), acid value 0.03

Component (C): Bisphenol A-diphosphate: CR741, CR741S (commercial names: manufactured by Daihachi Chemical Industry Co.), acid value 1.6, acid value 0.64, acid value 0.03

Component (D): SAN resin: SR05B (commercial name, manufactured by Ube Saikon K.K.)

Component (E): Epoxy stabilizer: 3,4-epoxycyclohexylmethyl-3',4'-epoxycyclohexane carboxylate, Celloxide 2021P (commercial name, manufactured by Daicel Chemical Industries)

Optional component (F): Polytetrafluoroethylene: Teflon 30J, (commercial name; manufactured by Mitsui DuPont Fluorochemical K.K.)

Using the above materials, extrusion was carried out on a biaxial extruder with a screw revolution speed of 200 rpm and a barrel temperature of 270–280° C., and the material was then cut into pellets.

Using the pellets manufactured in this manner, test pieces were molded with an 80T injection molding machine manufactured by Toyo Kikai Kinzoku K.K. Molding was carried out with a barrel temperature of 240° C. and a mold temperature of 60° C.

Mechanical properties such as Izod impact strength and tensile strength were evaluated according to ASTM standards.

Flame retardancy testing was carried out according to UL 94/V0, VI, VII. Five test pieces were tested at a thickness of $\frac{1}{16}$ inch according to the test method shown in Bulletin 94, "Combustion tests for materials classification" of Underwriters Laboratory Inc. According to this test method, the test materials were evaluated as either UL-94 V-0, V-I, V-II based on the results for the five test pieces.

For quantitative determination of alkali metals in component (B) ABS resin, after ashing of the samples, they were dissolved in pure water, and determination was carried out by the ICP method and atomic absorption spectrometry. The measurement values were shown in Table 1.

Evaluation of moisture resistance properties was carried out by placing the test pieces in a high-temperature, high-humidity oven at 60° C./85% RH and 95° C./98% RH and then evaluating their tensile strength and tensile elongation. The compositions used in the comparison examples and working examples and the evaluation results are shown in Tables 2, 3, and 4.

Moreover, measurement of the acid value of the phosphoric ester of component (C) was carried out according to ASTM D974, and measurements were conducted according to the following method.

After the samples were dissolved in a mixed solution of ethyl alcohol and water, they were evaluated by titration with N/10 sodium hydroxide solution using a bromothymol blue solution as an indicator.

Reagents:

(1) Mixed solution of ethyl alcohol/water

Ethyl alcohol (special reagent grade) and ion exchange water were mixed at a volume ratio of 9:1.

(2) Bromothymol blue solution 20 ml of 95 Vol % ethyl alcohol (special reagent grade) was added to 0.10 g of bromothymol blue (special reagent grade), and the mixture was then diluted with water to 100 ml.

(3) N/10 sodium hydroxide solution

Sulfamic acid (standard reagent grade) was dried with a vacuum sulfuric acid desiccator, from 0.2 to 0.3 g thereof was accurately weighed into a 200 ml triangular flask, approximately 25 ml of water was added and dissolved, and titration was carried out with N/10 sodium hydroxide solution using bromothymol blue solution as an indicator.

$$\text{Titer} = (S \times P)/(0.9709 \times A)$$

S: Weighed amount of sulfamic acid (g)
P: Purity of sulfamic acid (%)
A: Titration volume of N/10 sodium hydroxide solution (ml)

Procedure:

(1) 40 ml of a mixed solution of ethyl alcohol and water is placed in a 200 ml triangular flask using a graduated cylinder.

(2) 1 ml of bromothymol blue solution is added with a measuring pipet, and titration is carried out until a greenish-blue color of the N/10 sodium hydroxide solution is confirmed.

(3) An additional 10 g of the sample is weighed into a 200 ml triangular flask using an electronic Roberval balance, and reading is performed to one decimal place.

(4) Titration is carried out with N/10 sodium hydroxide solution in the same manner as under (2) above until a greenish-blue color is confirmed.

$$\text{Acid value (KOH mg/g)} = (A \times F \times 5.61)/S$$

A: Number of ml of N/10 sodium hydroxide required for titration of sample
F: Titer of N/10 sodium hydroxide solution
S: Sample (g)

TABLE 1

(Unit: ppm)

| Alkali metal | Na | K |
|---|---|---|
| Component (B) AT-07 | <0.5 | <0.5 |
| Component (B) UX050 | 34 | 128 |

TABLE 2

Comparison of ABS resin

| (% by weight) | | Comparison Example 1 | Working Example 1 |
|---|---|---|---|
| Component | PC | 72 | 72 |
| | SAN (SR05B) | 10.5 | |
| | ABS (UX050) | 7.5 | |
| | ABS (AT-07) | | 18 |
| | CR733S acid value 0.03 | 9.5 | 9.5 |
| | Teflon 30J | 0.5 | 0.5 |
| Physical properties | Izod kg cm/cm | 54 | 54 |
| | Tensile strength kg/cm$^2$ | 670 | 657 |
| | Tensile elongation % | 170 | 182 |
| | Flexural strength kg/cm$^2$ | 950 | 960 |
| | Modulus of flexural elasticity kg/cm$^2$ | 2.6 E3 | 2.6 E3 |
| | MI, 5 kg, 260° C. | 53 | 57 |
| | Load deformation temperature ° C. | 90 | 90 |

TABLE 2-continued

Comparison of ABS resin

| (% by weight) | Comparison Example 1 | Working Example 1 |
|---|---|---|
| UL94 @ 1.6 mm | V0 | V0 |
| After aging at 60° C/85% RH Tensile strength (kg/cm$^2$) Aging time | | |
| 500 hours | 664 | 672 |
| 1200 hours | 303 | 678 |
| 1850 hours | 106 | 361 |

TABLE 3

Comparison of acid values of phosphoric esters

| (% by weight) | | Example 2 | Example 3 | Example 4 |
|---|---|---|---|---|
| Component | PC | 67.5 | 67.5 | 67.5 |
| | ABS(AT-07) | 20 | 20 | 20 |
| | CR741 acid value 1.60 | 12 | | |
| | CR741 acid value 0.64 | | 12 | |
| | CR741S acid value 0.03 | | | 12 |
| | Teflon 30J | 0.5 | 0.5 | 0.5 |
| Physical properties | Izod kg cm/cm | 52 | 52 | 56 |
| | Tensile strength kg/cm$^2$ | 600 | 620 | 620 |
| | Tensile elongation % | 138 | 142 | 142 |
| | Flexural strength kg/cm$^2$ | 940 | 955 | 960 |
| | Modulus of flexural Elasticity kg/cm$^2$ | 2.58 E3 | 2.60 E3 | 2.60 E3 |
| | MI, 5 kg, 260° C. | 57 | 56 | 57 |
| | Load deformation Temperature ° C. | 90 | 90 | 90 |
| | UL94 @ 1.6 mm | V0 | V0 | V0 |
| After aging at 60° C./85% RH Tensile strength (kg/cm$^2$) Aging time | | | | |
| 1000 hours | | 210 | 515 | 640 |
| 2000 hours | | 86 | 358 | 655 |
| 3000 hours | | 1 or less | 112 | 666 |
| Tensile elongation (%) Aging time | | | | |
| 1000 hours | | 2 | 21 | 75 |
| 2000 hours | | 1 | 4 | 61 |
| 3000 hours | | 1 or less | 2 | 25 |

TABLE 4

Effect of addition of epoxy stabilizers

| (% by weight) | | Example 5 | Example 6 | Example 7 |
|---|---|---|---|---|
| Component | PC | 85 | 84.7 | 84.3 |
| | ABS (AT-07) | 10 | 10 | 10 |
| | CR733S acid value 0.03 | 4.5 | 4.5 | |
| | CR741S acid value 0.03 | | | 5.4 |
| | Celloxide 2021 P | | 0.3 | 0.3 |
| | Teflon 30J | 0.5 | 0.5 | 0.5 |
| Physical properties | Izod kg cm/cm | 47 | 69 | 70 |
| | Tensile strength kg/cm$^2$ | 620 | 670 | 640 |
| | Tensile elongation % | 118 | 205 | 82 |
| | Flexural strength kg/cm$^2$ | 990 | 1012 | 1003 |
| | Modulus of flexural elasticity kg/cm$^2$ | 2.58 E3 | 2.57 E3 | 2.60 E3 |
| | MI, 5 kg, 260° C. | 23 | 24 | 24 |
| | Load deformation Temperature ° C. | 110 | 110 | 108 |

TABLE 4-continued

Effect of addition of epoxy stabilizers

| (% by weight) | | Example 5 | Example 6 | Example 7 |
|---|---|---|---|---|
| UL94 @ 1.6 mm | | V0 | V0 | V0 |
| After aging at 95° C./98% RH | | | | |
| Tensile strength (kg/cm$^2$) Aging time | | | | |
| | 48 hours | 676 | 685 | 688 |
| | 168 hours | 100 | 700 | 757 |
| | 336 hours | 1 or less | 710 | 724 |
| | 504 hours | 1 or less | 695 | 710 |
| Tensile elongation % Aging time | | | | |
| | 48 hours | 18 | 20 | 20 |
| | 168 hours | 2 | 18 | 14 |
| | 336 hours | 1 or less | 15 | 13 |
| | 504 hours | 1 or less | 12 | 10 |

As shown in Table 2, the ABS resin composition with a low content of alkali metals showed high maintenance of tensile strength after heated aging and markedly improved moisture resistance properties. Furthermore, as shown in Table 3, moisture resistance was markedly improved by using phosphoric esters with an acid value lower than 1 or lower than 0.1. In addition, as shown in Table 4, the addition of an epoxy stabilizer also showed a capacity to markedly improve moisture resistance even in harsh high-temperature, high-humidity aging.

What is claimed is:

1. A polycarbonate resin composition, comprising a mixture of:
   (A) 1 to 99 parts by weight of polycarbonate resin having a viscosity average molecular weight of 10,000 to 100,000; and
   (B) 1 to 99 parts by weight of
      (B-1) a copolymer having as its component parts (a) an aromatic vinyl monomer components, (b) a cyanide vinyl monomer component, and (c) a rubber-like polymer; or
      (B-2) a copolymer having as it component parts (a) an aromatic vinyl monomer component and (b) a cyanide vinyl monomer components, the aforementioned (B-2) being a copolymer having a weight average molecular weight of 30,000 to 200,000;
      wherein copolymer (B-1) and copolymer (B-2) each have a sodium ion concentration of 1 ppm or less and a potassium ion concentration of 1 ppm or less; and
   (C) a phosphoric ester compound selected from bisphenol A tetraphenyldiphosphate, bisphenol A tetracresyldiphosphate, and bisphenol A tetraxylyldiphosphate, wherein the phosphoric ester compound has an acid value of 1 or less and is present in an amount of 1 to 40 parts by weight with respect to a total of 100 parts by weight of components (A) and (B).

2. The polycarbonate resin composition of claim 1 wherein component (B) is a copolymer selected from among ABS, AES, ACS, and AAS resins.

3. The polycarbonate resin composition of claim 1 wherein (E) an epoxy stabilizer is additionally present in an amount of from 0.01 to 10 parts by weight with respect to a total of 100 parts by weight of components (A) and (B).

4. The polycarbonate resin composition of claim 3, wherein the epoxy stabilizer of component (E) is (3',4'-epoxycyclohexane)methyl 3,4-epoxycyclohexylcarboxylate.

5. The polycarbonate resin composition of claim 1 wherein the polycarbonate resin of component (A) is obtained by melt polymerization.

6. The polycarbonate resin composition of claim 1 wherein the polycarbonate resin composition contains 1 ppm or less of an alkali metal.

7. The polycarbonate resin composition of claim 1 wherein the phosphoric ester compound has an acid value of 0.5 or less.

8. The polycarbonate resin composition of claim 1 wherein the phosphoric ester compound has an acid value of 0.2 or less.

9. The polycarbonate resin composition of claim 1 wherein the phosphoric ester compound has an acid value of 0.1 or less.

10. A polycarbonate resin composition comprising a melt mixture of:
    (A) 1 to 99 parts by weight of polycarbonate resin having a viscosity average molecular weight of 10,000 to 100,000;
    (B-2) a copolymer having as its component parts (a) an aromatic vinyl monomer component and (b) a cyanide vinyl monomer component, the aforementioned (B-2) being a copolymer having a weight average molecular weight of 30,000 to 200,000 and having a sodium ion concentration of 1 ppm or less and a potassium ion concentration of 1 ppm or less;
    (C) a phosphoric ester compound selected from bisphenol A tetraphenyldiphosphate, bisphenol A tetracresyldiphosphate, and bisphenol A tetraxylyldiphosphate, wherein the phosphoric ester compound has an acid value of 1 or less and is present in an amount of from 1 to 40 parts by weight with respect to a total of 100 parts by weight of components (A) and (B-2); and
    (E) an epoxy stabilizer in an amount of from 0.01 to 10 parts by weight with respect to a total of 100 parts by weight of components (A) and (B-2).

11. A polycarbonate resin composition, comprising a mixture of:
    (A) 67.5 to 85 parts by weight of polycarbonate resin having a viscosity average molecular weight of 10,000 to 100,000; and
    (B-1) 10 to 20 parts by weight of a copolymer having as its component parts (a) an aromatic vinyl monomer components, (b) a cyanide vinyl monomer component, and (c) a rubber-like polymer; wherein copolymer (B-1) has a sodium ion concentration of 1 ppm or less and a potassium ion concentration of 1 ppm or less; and
    (C) a bisphenol A tetraphenyldiphosphate having an acid value of 1 or less, present in an amount of 4.7 to 13.7 parts by weight with respect to a total of 100 parts by weight of components (A) and (B).

12. The polycarbonate resin composition of claim 11, further comprising 0.01 to 10 parts by weight of (E) an epoxy stabilizer with respect to a total of 100 parts by weight of components (A) and (B).

* * * * *